United States Patent [19]

Hinze

[11] 4,407,616

[45] Oct. 4, 1983

[54] WHEELCHAIR LOCK FOR REDUCING WHEEL SPOKE INTERFERENCE

[75] Inventor: William W. Hinze, Hutchinson, Kans.

[73] Assignee: Collins Industries, Inc., Hutchinson, Kans.

[21] Appl. No.: 295,379

[22] Filed: Aug. 24, 1981

[51] Int. Cl.[3] ........................... B60P 7/08; B60T 3/00

[52] U.S. Cl. ........................................ 410/3; 188/2 F; 188/32; 296/65 A

[58] Field of Search ................ 188/32, 2 F, 4 R, 4 A, 188/5-9, 171; 70/226; 296/65 A, 65 R; 410/2, 3, 4, 7, 19, 9, 51; 292/330, 341.17, 359, DIG. 25

[56] References Cited

U.S. PATENT DOCUMENTS 4,062,209 12/1977 Downing et al. ..................... 70/226

FOREIGN PATENT DOCUMENTS 2814131 10/1979 Fed. Rep. of Germany ........ 410/51

*Primary Examiner*—Douglas C. Butler

*Attorney, Agent, or Firm*—Edwin H. Crabtree

[57] ABSTRACT

An improved wheelchair lock for receiving a ground wheel of a wheelchair and securing the wheelchair in place. The improved wheelchair lock aids the user of the wheelchair in guiding the wheel into the lock with the lock designed to substantially, if not, eliminate the problem of the lock contacting the spokes of the ground wheel which heretofore prevented the locking of the ground wheel.

10 Claims, 7 Drawing Figures

WHEELCHAIR LOCK FOR REDUCING WHEEL SPOKE INTERFERENCE

The improved wheelchair lock described herein is a substantial improvement over the wheelchair lock described in U.S. Pat. No. 4,062,209, inventors Donald L. Collins et al and assigned to Collins Industries, Hutchinson, Kans. The wheelchair lock described in U.S. Pat. No. 4,062,209 and the cited references mentioned in this patent are incorporated by reference.

Heretofore wheelchair locks for securing the handicapped in a wheelchair while riding in a vehicle have been floor mounted or mounted along the sides of the vehicle. The wheelchair ground wheels are guided between a pair of guide arms and secured therebetween by a spring biased latch. The wheels can be released manually or electrically. The guide arms are mounted horizontally and quite often the latch comes into contact with the spokes of the ground wheel requiring the handicapped person or operator of the vehicle to maneuver the wheels of the wheelchair until the latch clears the spokes. This, of course, requires additional time in securing the wheelchair at the discomfort of the wheelchair occupant.

Also, the manual release of the latch was positioned adjacent the side of the vehicle and at the rear of the wheelchair making it difficult to reach.

Further, quite often the ground wheel of the wheelchair would contact the outside of the latch rotating the latch into a closed locked position without the wheel received inside the latch. This required unlocking the latch and again moving the ground wheel into contact with the inside of the latch with the wheel secured therein.

The above mentioned problems are solved by the subject invention with additional advantages described herein.

SUMMARY OF THE INVENTION

The improved wheelchair lock includes guide arms and a latch angled upwardly toward the center of the ground wheels so interference between the latch and the spokes of the ground wheel are substantially reduced if not completely eliminated. The latch of the improved lock is designed so it will not rotate into a closed position without a portion of the ground wheel received inside the "U" shaped portion of the latch.

The new wheelchair lock is streamline in design, rugged in construction and can be mounted on an upright stand, support, or on adjustable rails attached to the side of the vehicle. The release of the latch can be operated manually or electrically by a remote operator such as the driver of the vehicle or wheelchair assistant. Also the lock includes a manual release lever that can be hand or foot operated. This manual release lever overrides the electrical release of the latch should there be an electrical failure. The lever extends outwardly and is adjacent the side of the wheelchair for ease in operation by the occupant of the wheelchair or his assistant.

While the wheelchair lock is used primarily for vehicles, it can also be used equally well in hospitals, homes for the handicapped or other types of installations.

The improved wheelchair lock for securing a wheelchair having ground wheels with spokes includes a support with a pair of guide arms attached to the support and angled upwardly toward the center of the ground wheel. A "U" shaped spring biased latch is attached to the top of one of the guide arms for receiving a portion of the ground wheel when the wheel is received between the guide arms. The latch when contacted by the wheel, rotates into a closed position between the guide arms for securing the wheel therebetween. A spring biased latch plunger is attached to the latch and biased against the bottom of the latch when the latch is in an opened positioned. When the latch is rotated into a closed position, the plunger is received in an aperture in the latch and the latch is closed in a lock position. A manual release lever is attached to the support and disposed above and adjacent the latch plunger. By moving the manual release lever downwardly the lever engages the latch plunger moving the plunger downwardly and removing the plunger from the aperture in the latch thereby releasing the latch from a closed position.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
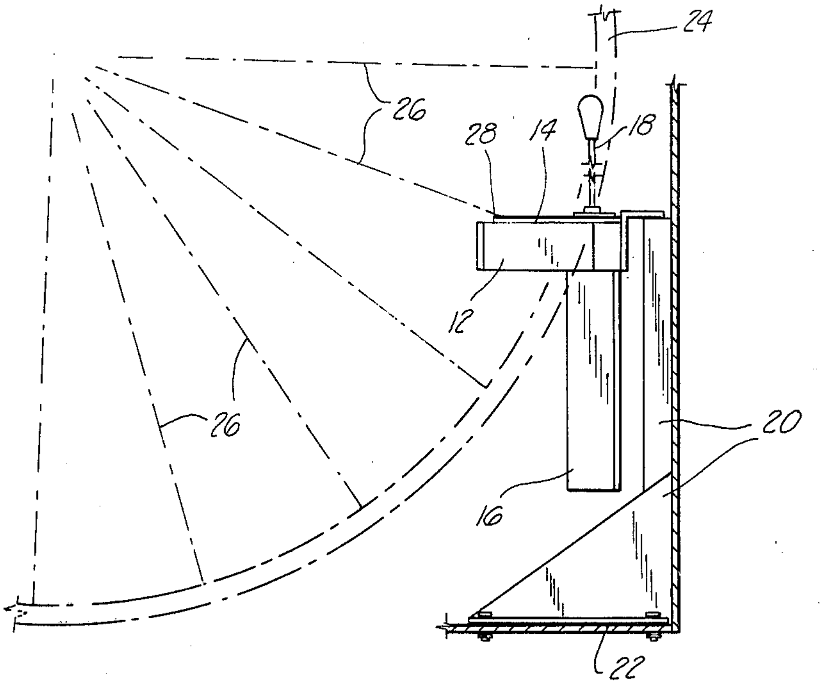
FIG.-1 PRIOR ART
FIG. 1 illustrates a prior art wheelchair lock receiving a portion of a ground wheel of a wheelchair.

In FIG. 1 a prior art wheelchair lock designated by general reference numeral 10 is shown. This is the same type of lock as disclosed in U.S. Pat. No. 4,062,209. The lock 10 broadly includes a pair of guide arms 12, a spring biased "U" shaped latch 14 attached to the side of one of the arms 12, a plunger housing 16 with the plunger received therein mounted below the latch 14, a latch release handle 18 extending upwardly from the housing 16, and a stand 20 mounted on top of a floor 22.

In this figure a ground wheel 24 with spokes 26 are shown in dotted lines with the wheel 24 received between the guide arms 12. The wheelchair is not shown in the drawings. It should be noted in this view one of the spokes 26 has come into contact with the latch 14 at a point indicated by number 28. Because of this common interference between the spokes 26 and the latch 14 the wheel 24 has to be moved or manipulated until the spokes 26 are clear of the latch 14 and the "U" shaped portion of the latch 14 is free to receive the wheel 24 therein.

Also, it should be noted the position of the latch release handle 18 at the rear of the wheel 24. The handle 18 in this position is often hard to reach when the wheelchair occupant desires to be removed from the lock 10.

Figure 2:
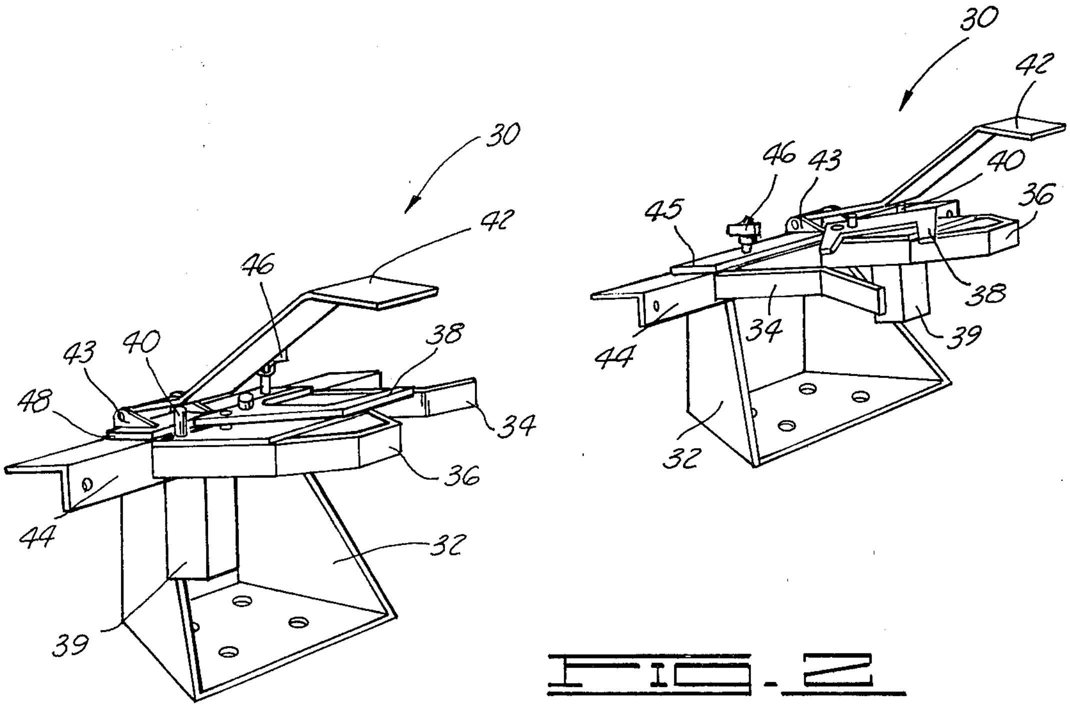
FIG. 2 is a perspective view of the improved wheelchair locks.

In FIG. 2 the new improved wheelchair lock is shown in a perspective view and designated by general reference numeral 30. In this view, a pair of the locks 30 are shown with the right hand lock 30 in an opened position for receiving the ground wheel 24 while the left hand lock 30 is in a closed locked position. It can be appreciated that the two identical locks 30 are used for securing both wheels of a wheelchair but for simplicity the structure of only one of the locks 30 is described and claimed herein. The lock 30 includes a support 32, a pair of guide arms 34 and 36, a spring biased "U" shaped latch 38, a latch plunger housing 39 with a plunger 40 mounted therein and shown in greater detail in FIGS. 3 and 3A, and a hand or foot operated manual release lever 42.

Mounted on top of the support 32 is a "L" shaped bracket 44 which allows the guide arms 34 and 36, latch 38 and plunger housing 39 to slide thereon so the locks 30 can be properly adjusted for the width between the two ground wheels 24 of the wheelchair.

The left hand lock 30 shown in FIG. 2 illustrates the "U" shaped latch 38 in a closed locked position. The right hand lock 30 illustrates the latch 38 in an opened position ready to receive the ground wheel 24 therein.

The lever 42 mounted on a hinge 43 on top of an "L" shaped mounting plate 45 which engages the top of the bracket 33 and slides thereon. An adjustment handle 46 is used for securing the plate 45 to the bracket 44.

Figure 3A:
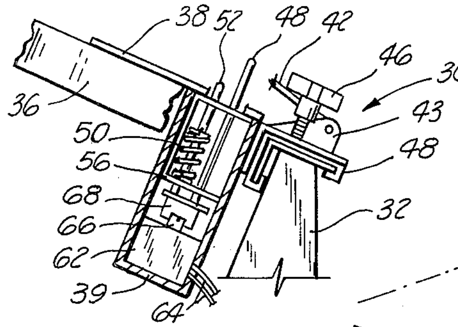
FIG. 3A illustrates a cut-away section of an electrically operated solenoid used for moving the latch plunger for releasing the latch.
Figure 3:
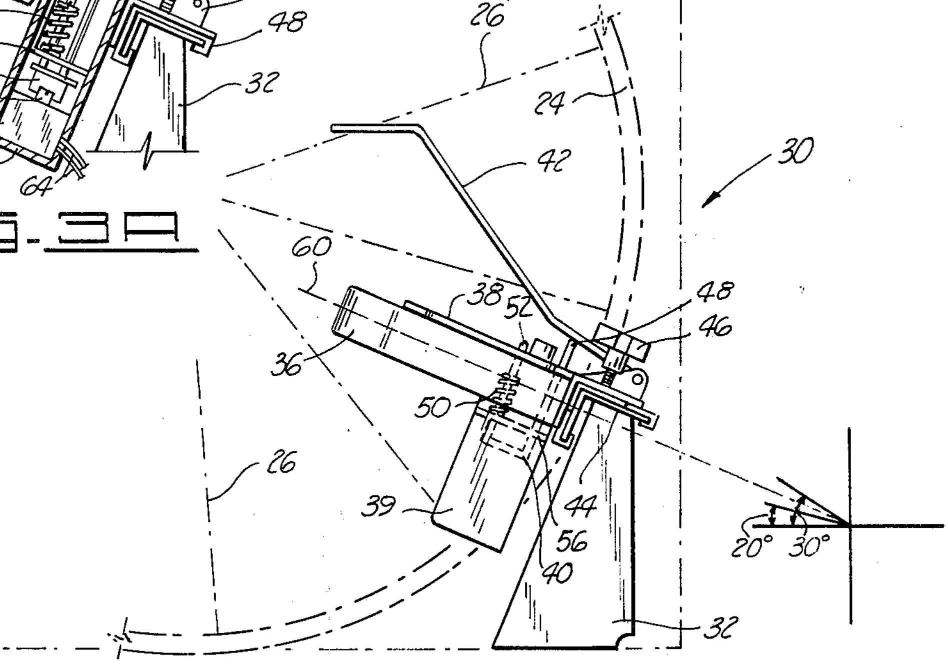
FIG. 3 is a side view of one of the wheelchair locks receiving a portion of one of the ground wheels.

In FIG. 3 a side view of the improved wheelchair lock 30 is illustrated with the plunger 40 shown in dotted lines and received in the plunger housing 39. The plunger 40 includes a first plunger arm 48 which extends upwardly and engages the bottom of the release lever 42. When the release lever 42 is lowered the first plunger arm 48 is urged downwardly and the bias force of a coiled spring 50 around a second plunger arm 52 is overcome and the second plunger arm 52 is lowered removing the end of the arm 52 from an aperture 54 in the latch 38. The aperture can be seen clearly in FIGS. 5 and 6. The plunger 40 inside plunger housing 50 is guided therein by a plunger guide 56.

Also shown in this view is a center line 60 extending through the center of the guide arms 34 and 36 and parallel to the latch 38. This center line is in a range between 20° and 30° from the horizontal and is in substantially the same plane as the spokes 26 of the ground wheel 24 and quite often parallel thereto. It has been found by mounting the latch 38 on top of one of the guide arms 34 and 36 and placing the latch 38 and the guide arms 34 and 36 in this angle range that spoke interference is substantially reduced if not eliminated.

In FIG. 3A a cut-away of the plunger housing 39 is shown with a solenoid 62 having electrical leads 64 attached thereto. The solenoid 62 includes a solenoid arm 66 which is attached to a plate 68 connected to the first plunger arm 48 and second plunger arm 52. When the solenoid 62 is activated, the solenoid arm 66 is lowered thereby lowering the second plunger arm 52 and removing it from the aperture 54 in the latch plate 38. This allows the spring biased latch 38 to pivot into an open position for releasing the ground wheel 24 from the lock 10. Should there be an electrical failure the release lever 42 can be used to override the solenoid 62 and lower the arm 52 by engaging the arm 48.

Figure 4:
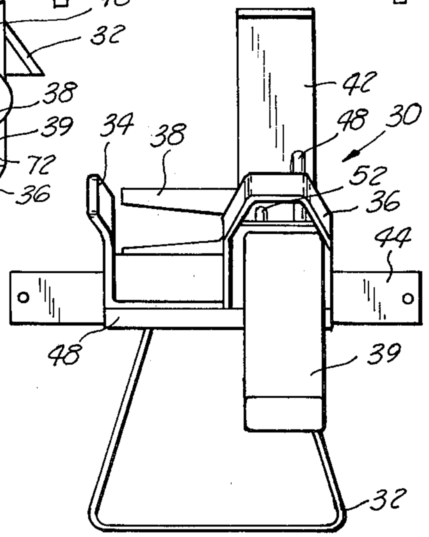
FIG. 4 is a front view of the wheelchair lock.

In FIG. 4 a front view of the lock 30 is illustrated. In this view the release lever 42 can be seen resting on top of the first plunger arm 48. Also the spring biased latch 38 is shown in a closed position.

Figure 5:
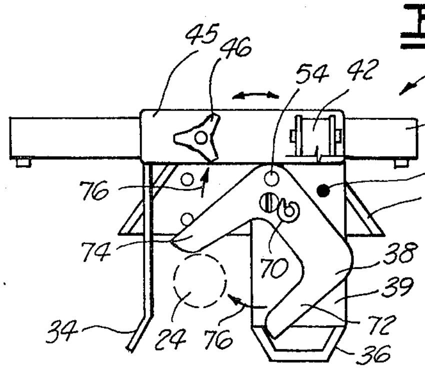
FIG. 5 is a top view of the wheelchair lock in an opened position ready to receive a portion of the ground wheel.
Figure 6:
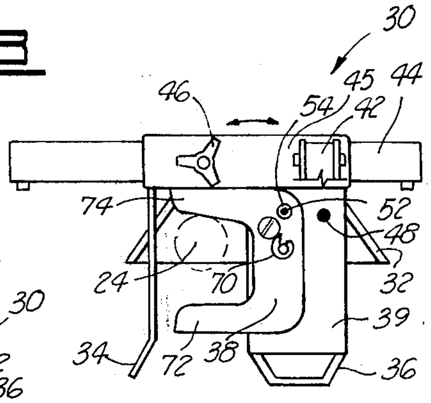
FIG. 6 is a top view of the wheelchair lock in a closed position securing the ground wheel between the guide arms.

In FIG. 5 a top view of the lock 30 is illustrated. In this view, the manual release lever 42 has been cut-away to show a top view of the spring biased latch 38 in an open position. In this view, a spring 70 can be seen which is used to bias the latch 38 in a counter clockwise direction. It should be noted a first arm 72 of the latch 38 is disposed above the guide arm 36 so it will not contact the ground wheel 24 in an opened position. A second arm 74 of the latch 38 is received between the guide arms 34 and 36 and does contact the ground wheel 24 when it is received between the guide arms 34 and 36. When the ground wheel 24 is received between the guide arms 34 and 36 biased force of the spring 70 is overcome and the latch 38 is rotated in a clockwise direction as indicated by arrows 80. The latch 38 continues to rotate in a clockwise direction until the top of the second plunger arm 52 which is biased against the bottom of the latch 38 is received inside the aperture 54. When this is accomplished as shown in FIG. 6, the top of the second plunger arm 52 is urged upwardly through the aperture thereby securing the latch 38 in a locked position with the ground wheel 24 disposed between the guide arms 34 and 36 and the arms 72 and 74 of the "U" shaped latch 38. As mentioned above when it is desired to release the ground wheel 24 from the latch 38, the manual release lever 42 is contacted by hand or foot urging the first plunger arm 48 downwardly which in turn lowers the second plunger arm 52 downwardly remocving the end of the arm 52 from the aperture 54. This allows the bias force of the spring 70 to rotate the latch 38 in a counter clockwise direction thereby releasing the ground wheel 24 from between the guide arms 34 and 36 and the latch 38.

While the stand 32 is illustrated in FIGS. 2 through 6, it should be appreciated a support, a side mounted rail attached to the sides of the vehicle or various other types of structures can be used equally well for mounting the lock 30 thereon and providing the advantages as described herein for the handicapped in a wheelchair.

Changes may be made in the construction and arrangement of the parts or elements of the embodiments as described herein without departing from the spirit or scope of the invention defined in the following claims.

What is claimed is:

1. An improved wheelchair lock for securing a wheelchair, the wheelchair having a pair of ground wheels with spokes, the lock comprising:

a support;

a pair of guide arms attached to the support, the guide arms disposed in a spaced relationship to each other and extending outwardly from the support for receiving a portion of one of the ground wheels therebetween;

latch means attached to one of the guide arms, the latch means receiving a portion of one of the ground wheels when the ground wheel is received between the guide arms for securing the ground wheel therein, the latch means angled upwardly toward the center of the ground wheel; and means for releasing the latch means so the ground wheel can be disengaged from between the guide arms.

2. The improved wheelchair lock as described in claim 1 wherein the latch means is angled upwardly toward the center of the ground wheel at an angle in a range of 20° to 30° from the horizontal.

3. The improved wheelchair lock as described in claim 1 wherein the guide arms are angled upwardly toward the center of the ground wheel at an angle in a range of 20° to 30° from the horizontal.

4. The improved wheelchair lock as described in claim 1 wherein the latch means includes a pivotally attached "U" shaped spring biased latch, the latch biased in an open position for receiving a portion of the ground wheel when the ground wheel is received between the guide arms, the latch when contacted by the wheel rotating into a closed position between the guide arms for securing the wheel therebetween.

5. The improved wheelchair lock as described in claim 4 wherein the latch means further includes a spring biased latch plunger, the plunger biased against the bottom of the latch when the latch is in an open position, when the latch is rotated into a closed position, the plunger is received in an aperture in the latch and the latch is closed in a locked position.

6. The improved wheelchair lock as described in claim 5 wherein the means for releasing the latch means includes a manual release lever attached to the support and disposed above and adjacent the latch plunger, by moving the manual release lever downwardly the lever engages the latch plunger moving the plunger downwardly removing the plunger from the aperture in the latch thereby releasing the latch from a closed position.

7. The improved wheelchair lock as described in claim 5 wherein the means for releasing the latch means includes a solenoid having a solenoid arm attached to the latch plunger, the solenoid when electrically activated urges the solenoid arm downwardly moving the latch plunger downwardly and removing the plunger from the aperture in the latch thereby releasing the latch from a closed position.

8. An improved wheelchair lock for securing a wheelchair, the wheelchair having a pair of ground wheels with spokes, the lock comprising:

a support;

a pair of guide arms attached to the support, the guide arms disposed in a spaced relationship to each other and extending outwardly from the support for receiving a portion of one of the ground wheels therebetween, the guide arms angled upwardly toward the center of the ground wheels;

a "U" shaped spring biased latch attached to the side of one of the guide arms, the latch receiving a portion of one of the ground wheels when the ground wheel is received between the guide arms for securing the ground wheel therein, the latch angled upwardly toward the center of the ground wheel;

a spring biased plunger attached to one of the guide arms, the plunger biased against the bottom of the latch when the latch is in an opened position, when the latch is rotated into a closed position, the plunger is received in an aperture in the latch and the latch is closed in a locked position; and means for releasing the latch so the ground wheel can be disengaged from between the guide arms.

9. The improved wheelchair lock as described in claim 2 wherein the spring biased latch is angled upwardly toward the center of the ground wheel at an angle in a range of 20° to 30° from the horizontal.

10. The improved wheelchair lock as described in claim 8 wherein the guide means are angled upwardly toward the center of the ground wheel at an angle in the range of 20° to 30° from the horizontal.

* * * * *